(12) United States Patent
Tulshan et al.

(10) Patent No.: US 12,045,213 B2
(45) Date of Patent: Jul. 23, 2024

(54) SYSTEMS AND METHODS FOR MONITORING DATA QUALITY ISSUES IN NON-NATIVE DATA OVER DISPARATE COMPUTER NETWORKS

(71) Applicant: Capital One Services, LLC, McLean, VA (US)

(72) Inventors: Lokesh S. Tulshan, Bangalore (IN); Kukumina Pradhan, Bangalore (IN); Akhil Jain, Richmond, VA (US); Mohammad Nayaz Arshad, Glen Allen, VA (US); Yatindra Nath, Bangalore (IN)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/579,965

(22) Filed: Jan. 20, 2022

(65) Prior Publication Data

US 2023/0169051 A1    Jun. 1, 2023

(30) Foreign Application Priority Data

Dec. 1, 2021    (IN) .............................. 202141055603

(51) Int. Cl.
*G06F 16/00*    (2019.01)
*G06F 16/215*    (2019.01)
*G06F 16/25*    (2019.01)
*G06V 30/19*    (2022.01)

(52) U.S. Cl.
CPC .......... *G06F 16/215* (2019.01); *G06F 16/258* (2019.01); *G06V 30/1916* (2022.01)

(58) Field of Classification Search
None
See application file for complete search history.

(56) References Cited

U.S. PATENT DOCUMENTS

| | | | | |
|---|---|---|---|---|
| 6,675,351 | B1 * | 1/2004 | Leduc ................... | G06F 40/177 715/264 |
| 7,194,477 | B1 * | 3/2007 | Bradley ................. | G06Q 30/02 707/999.102 |
| 2003/0097364 | A1 * | 5/2003 | Bata ........................ | G06F 16/84 |
| 2009/0006431 | A1 * | 1/2009 | Agrawal ................ | G06F 16/217 |
| 2012/0317543 | A1 * | 12/2012 | Baudel ....................... | G06F 8/33 717/105 |
| 2016/0350721 | A1 * | 12/2016 | Comerford ........... | H04L 67/306 |
| 2021/0182293 | A1 * | 6/2021 | Zhang ................... | G06F 16/221 |
| 2021/0182859 | A1 * | 6/2021 | Srinivasa Rao .... | G06Q 20/4016 |
| 2022/0084649 | A1 * | 3/2022 | Anderson .............. | G16H 10/60 |
| 2023/0019794 | A1 * | 1/2023 | Saville .................. | G06F 16/532 |

* cited by examiner

*Primary Examiner* — Bai D Vu
(74) *Attorney, Agent, or Firm* — Perkins Coie LLP

(57) ABSTRACT

A method or system for monitoring data quality issues in non-native data over disparate computer networks is described. The system may monitor incoming data entries of non-native data over a disparate computer network. The system may generate for display, on a user interface, a recommendation based on a difference between a number of the first plurality of data entries and a dynamic threshold.

17 Claims, 5 Drawing Sheets

Outstanding Issues
Low Volume (54%)

Recommendations
Assign Task Owner

Review Data

| | A | B | C | D | E | F |
|---|---|---|---|---|---|---|
| 1 | ID | Last Name | First Name | City | State | Gender |
| 2 | 1 | DOE01 | JANE01 | Los Angeles | California | Female |
| 3 | 2 | DOE02 | JANE02 | Sedona | Arizona | Female |
| 4 | 3 | DOE01 | JOE01 | Elmira | New York | Male |
| 5 | 4 | DOE02 | JOE02 | Lackawana | New York | Male |
| 6 | 5 | DOE03 | JOE03 | Defiance | Ohio | Male |
| 7 | 6 | DOE04 | JOE04 | Tel Aviv | Israel | Male |
| 8 | 7 | DOE05 | JOE05 | Cimax | North Carolina | Male |
| 9 | 8 | DOE03 | JANE03 | Liberal | Kansas | Female |
| 10 | 9 | DOE04 | JANE04 | Montreal | Canada | Female |
| 11 | 10 | DOE05 | JANE05 | New York | New York | Female |
| 12 | 11 | DOE06 | JOE06 | Hot Coffe | Mississippi | Male |
| 13 | 12 | DOE06 | JANE06 | Java | Virginia | Female |
| 14 | 13 | DOE07 | JOE07 | Varna | Bulgaria | Male |
| 15 | 14 | DOE08 | JOE08 | Moscow | Russia | Male |

FIG. 2

SYSTEMS AND METHODS FOR MONITORING DATA QUALITY ISSUES IN NON-NATIVE DATA OVER DISPARATE COMPUTER NETWORKS

CROSS-REFERENCE TO RELATED APPLICATIONS

This application claims the benefit of priority of Indian Provisional Application No. 202141055603, filed Dec. 1, 2021. The content of the foregoing application is incorporated herein in its entirety by reference.

BACKGROUND

Cyber incident management is typically team-based and involves multiple team members (analysts) and incident detection systems working together to resolve a given cyber incident (e.g., unauthorized communications, a data breach, phishing attack, etc.). The system may enable automatic management of different cyber incidents, as well as the coordination of different analysts' contributions. However, the types of cyber incidents are constantly evolving and routinely involve a cat-and-mouse approach to detecting and resolving issues. Due to the diversity of types of cyber incidents and the nature of cyber incidents having been specifically designed to avoid automatic detection, automated cyber incident management is infeasible.

SUMMARY

Despite the foregoing, recent advancements in artificial intelligence and machine learning applications have given hope for some automation in cyber incident management. However, a key technical hurdle to the use of artificial intelligence and machine learning applications (referred collectively and/or individually as AI models machine learning models, or simply models) is the lack of reliable training data. For example, in many AI models, a robust suite of training data (e.g., indicating characteristics of previously, labeled incidents) is lacking. This is further compounded in that in many instances the data that would be required for training (e.g., communication records, transaction receipts, etc.) is not owned by the model providers and its use is severely restricted based on security and privacy concerns.

This is particularly problematic for parties that monitor network communications and are not the creators (or origination point) of the data, but that nonetheless rely on, and are affected by, its authenticity. In many instances, these parties are not able to query the creators (or origination points) of the communications to verify the authenticity or to repair any corruptions. Instead, these parties must rely on the data that they are provided. As such, any model that they develop is similarly based on the data that they are provided.

Accordingly, when a party uses data from various sources to create models to drive decisions, any errors in input data could cause issues in decision making and create substantial errors in model outputs. That is, the less reliable the input data is, the less reliable the model. One of the primary sources of data errors is partial/duplicate data-loads in the tables due to issues with the source or the file transfer/loading. Using such partially loaded data in the model could drive incorrect conclusions/decisions, leading to significant risks and degradations of the model. As stated above, the lack of ownership of the data, issues related to privacy and security, and/or inability to verify data with a creator excludes conventional solutions to data verification and data auditing.

For example, as data traverses a disparate computer network (e.g., a computer network featuring multiple nodes) it may become corrupted, duplicated, or dropped because the data must go through multiple systems and, each time, the data is modified and adjusted. At any point along the journey there may be a computer system (e.g., corresponding to a node in the network) where a job failed (e.g., causing missing data) or a job was executed twice (e.g., causing a duplication). There may also be proprietary systems that obscure the data as well as re-formatting, adjustments to the data using configuration files, and/or standardization of the data (e.g., causing further changes). Accordingly, the information in a communication may change and may change in ways in which the creator cannot contain. As such, queries to the creator would not be helpful during a reconciliation and validation process of non-native data (i.e., data not created by the monitoring party).

In view of this technical limitation in this technology sphere, the methods and systems provide for monitoring data quality issues in non-native data over disparate computer systems. In particular, the system uses a computer model that is trained to identify variations in data entries. For example, as opposed to training a model to automate the validation and verification of non-native data in disparate computer networks, which is subject to the technical hurdles described above, the system instead uses dynamic thresholds at a table level to identify one-time volume deviations from the changes in data-loads over time while incorporating historical user feedback to eliminate false positives. That is, the system generates predictions and probabilities for a number of data entries in a given class in order to alert users of the potential of missing and duplicate data entries.

In some aspects, a method or system for monitoring data quality issues in non-native data over disparate computer networks is described. For example, the system may monitor incoming data entries of non-native data over a disparate computer network. The system may determine a first subset of the data entries that corresponds to a first criterion. The system may generate a first table corresponding to the first subset, wherein the first table comprises a first plurality of rows, and wherein each row of the first plurality of rows corresponds to a respective data entry in the first subset. The system may determine a number of the first plurality of rows. The system may determine, using a model, a first dynamic threshold, wherein the first dynamic threshold corresponds to the first criterion, wherein the model is trained to determine a dynamic threshold number corresponding to criteria based on historical data patterns. The system may determine a difference between the number of the first plurality of rows and the first dynamic threshold. The system may generate for display, on a user interface, a recommendation based on the difference.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

BRIEF DESCRIPTION OF THE DRAWINGS

FIG. 2 shows an illustrative user interface for monitoring data quality issues, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1:
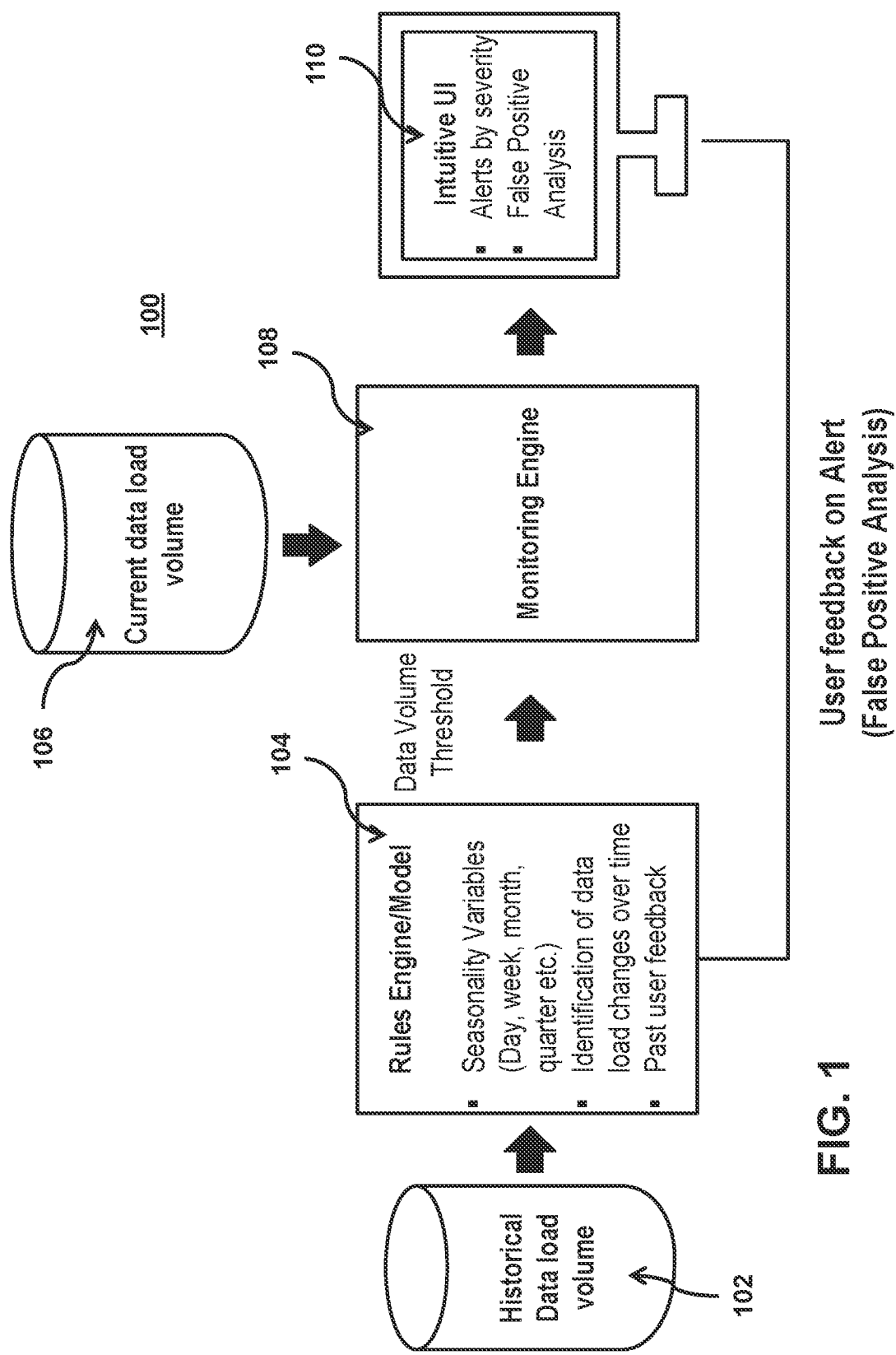
FIG. 1 shows an illustrative system architecture for monitoring data quality issues, in accordance with one or more embodiments.

FIG. 1 shows an illustrative system architecture for monitoring data quality issues, in accordance with one or more embodiments. For example, system 100 represents an illustrative system architecture for monitoring data quality issues in non-native data over disparate computer networks. As stated above, when a party uses data from various sources to create models to drive decisions, any errors in input data could cause issues in decision making and create substantial errors in model outputs. That is, the less reliable the input data is, the less reliable the model. One of the primary sources of data errors is partial/duplicate data-loads in the tables due to issues with the source or the file transfer/loading. Using such partially loaded data in the model could drive incorrect conclusions/decisions, leading to significant risks and degradations of the model. As stated above, the lack of ownership of the data, issues related to privacy and security, and/or inability to verify data with a creator excludes conventional solutions to data verification and data auditing.

System 100 may receive historical data load volume (e.g., data 102) and input this information into model 104. Model 104 may include a rules engine that applies various rules for interpreting data. Model 104 may use numerous metrics and information (as well as AI/machine learning models as described in relation to FIG. 3) to identify correlations and/or patterns. For example, the model may be trained to determine the dynamic threshold number corresponding to criteria based on historical user feedback indicating data entries linked to a false positive difference (e.g., as reported by a user based on user information). For example, the criterion may correspond to a given category (or group of categories) such as a merchant that generates data entries (e.g., credit card transactions). The system may therefore generate a dynamic threshold specific to this merchant and/or the volume of transactions that are received from that merchant on a given day, month, or other time period. The historical information may be indexed by the system such that based on the historical data, the model may automatically identify an expected number of rows to be loaded based on data load patterns in the specified table (e.g., a table corresponding to a given criterion). The model may determine the expected number of rows in the table based on numerous parameters such as: Weekday vs. Weekends, Day of the week, Holiday, Month-end, Start of the month, Month of Year.

Monitoring engine 108 (e.g., which may be implanted in or accessible by model 104) may receive a current data load volume (e.g., incoming data entries of non-native data over a disparate computer network). The system may then compare this information and generate recommendation 110 based on any detected issues.

As an example, the system may create models to drive decisions such as those related with credit and Anti Money Laundering (AML) and Suspicious Activity Report (SARs) along with regulatory reporting. In such cases, any errors in input data could cause issues in decision making and could have regulatory impact including substantial AML fines. One of the primary sources of data errors is partial/duplicate data-loads in the tables due to issues with the source or the file transfer/loading. Using such partially loaded data in the model could drive incorrect conclusions/decisions, leading to significant regulatory/credit risk for a model based on this data. One of the primary examples of the impact of issues with data-loads could be observed in the AML area.

As a further illustrative example, the system may need to monitor financial services activity in a high-risk country. For example, a customer may conduct multiple cash withdrawals in a given high-risk country. For example, if data is missing then a conventional model may miss the transaction, or if there is duplicate data (e.g., 3 in a row) the transaction may become suspicious. This results in bad transactions being missed or a user having their card shutdown erroneously.

This is particularly problematic for parties that monitor network communications and are not the creators (or origination point) of the data, but that nonetheless rely on, and are affected by, its authenticity. In many instances, these parties are not able to query the creators (or origination points) of the communications to verify the authenticity or to repair any corruptions. Instead, these parties must rely on the data that they are provided. As such, any model that they develop is similarly based on the data that they are provided.

FIG. 2 shows an illustrative user interface for monitoring data quality issues, in accordance with one or more embodiments. For example, the system and methods described herein may generate for display, on a local display device (e.g., user terminal 324 (FIG. 3) described below), a user interface for monitoring data quality issues. User interface 200 may comprise an interface for monitoring data quality issues. In some embodiments, user interface 200 may comprise an integrated cyber incident management system that may include a cyber incident management system that integrates multiple other cyber incident management systems (e.g., a cyber incident management system). Through user interface 200, the integrated cyber incident management system, may monitoring data quality issues and/or perform one or more operations (e.g., as shown in user interface 200 (FIG. 2) below) such as monitoring progress of one or more data quality issues in non-native data.

User interface 200 may generate display data related to a detected issue and/or monitoring data quality issues in non-native data over disparate computer networks. For example, the system may store native data corresponding to fields of the system (or other non-integrated systems) and issue data (e.g., issue data 204). For example, issue data 204 may describe a relationship of the native data (e.g., recommendation 206) to detected data quality issues in non-native data.

In some embodiments, user interface 200 (or the issue data therein) may be presented as a status page. The status page may include summary information about a cyber incident, affected systems/domains, responsible team members (e.g., analysts assigned to resolve the issue), etc. The status page may also include queries that may be performed (e.g., queries based on progress, affected systems, milestones, governance, etc.). User interface 200 may also include a Gantt chart indicating progress for one or more tasks and sub-tasks, filters, and/or provide view changes. User interface may also include analyst listings and metrics related to the cyber incident (e.g., velocity, etc.). User interface 200 may also include an icon (e.g., recommendation 206) for accessing additional information about an issue and/or recommendation (e.g., recommendation 206).

Native data may comprise native data or native data-formats comprise data that originates from and/or relates to the cyber incident management system, system components, and/or their respective plugins. Non-native data may comprise data originating from other sources. For example, as data traverses a disparate computer network (e.g., a computer network featuring multiple nodes) it may become corrupted, duplicated, or dropped because the data must go through multiple systems and, each time, the data is modified and adjusted. At any point along the journey there may be a computer system (e.g., corresponding to a node in the network) where a job failed (e.g., causing missing data) or a job was executed twice (e.g., causing a duplication). There may also be proprietary systems that obscure the data as well as re-formatting, adjustments to the data using configuration files, and/or standardization of the data (e.g., causing further changes). Accordingly, the information in a communication may change and may change in ways in which the creator cannot contain.

In some embodiments, native data may include data resulting from native code, which is code written specifically for the cyber incident management system, a system component, a respective plugin designed therefor. The native data may also include data or metadata related to the cyber incident. The native data may also include data pull from a remote source (e.g., a cyber incident intelligence vendor).

The issue data may be presented in any format and/or representation of data that can be naturally read by humans. In some embodiments, the issue data may appear as a graphical representation of data (e.g., table 202). For example, the issue data may comprise a sunburst graph of the integrated structure. In such cases, generating the sunburst graph may comprise determining a plurality of structure nodes for the integrated structure and graphically representing a relationship of the plurality of structure nodes. In some embodiments, the relationship of the native data to the integrated structure may comprise a graphical display describing a hierarchal relationship of the first hierarchy of tasks and the second hierarchy of tasks, a point of processing of a cyber incident, and/or information is known or not known about the cyber incident as well as include data pre-fetched about the cyber incident (e.g., user information about a detected issue). For example, table 202 may include an incident scoring that indicates a severity, classification, and/or other metric.

User interface 200 may also include recommendation 206. For example, selection of recommendation 206 may provide collaborative content management to define procedures and instructions and integrate content from or link to confluence page which contain detailed work instructions (and ability to display graphical process representation).

Table 202 may include a plurality of data entries, wherein the table comprises a first plurality of rows, and wherein each row of the first plurality of rows corresponds to a respective data entry in the first subset. Table 202 may comprise a spreadsheet for organization, analysis, and storage of data in tabular form. Table 202 may comprise data entered in cells of a table. Each cell may contain either numeric or text data, or the results of formulas that automatically calculate and display a value based on the contents of other cells. A spreadsheet may also refer to one such electronic document.

Figure 3:
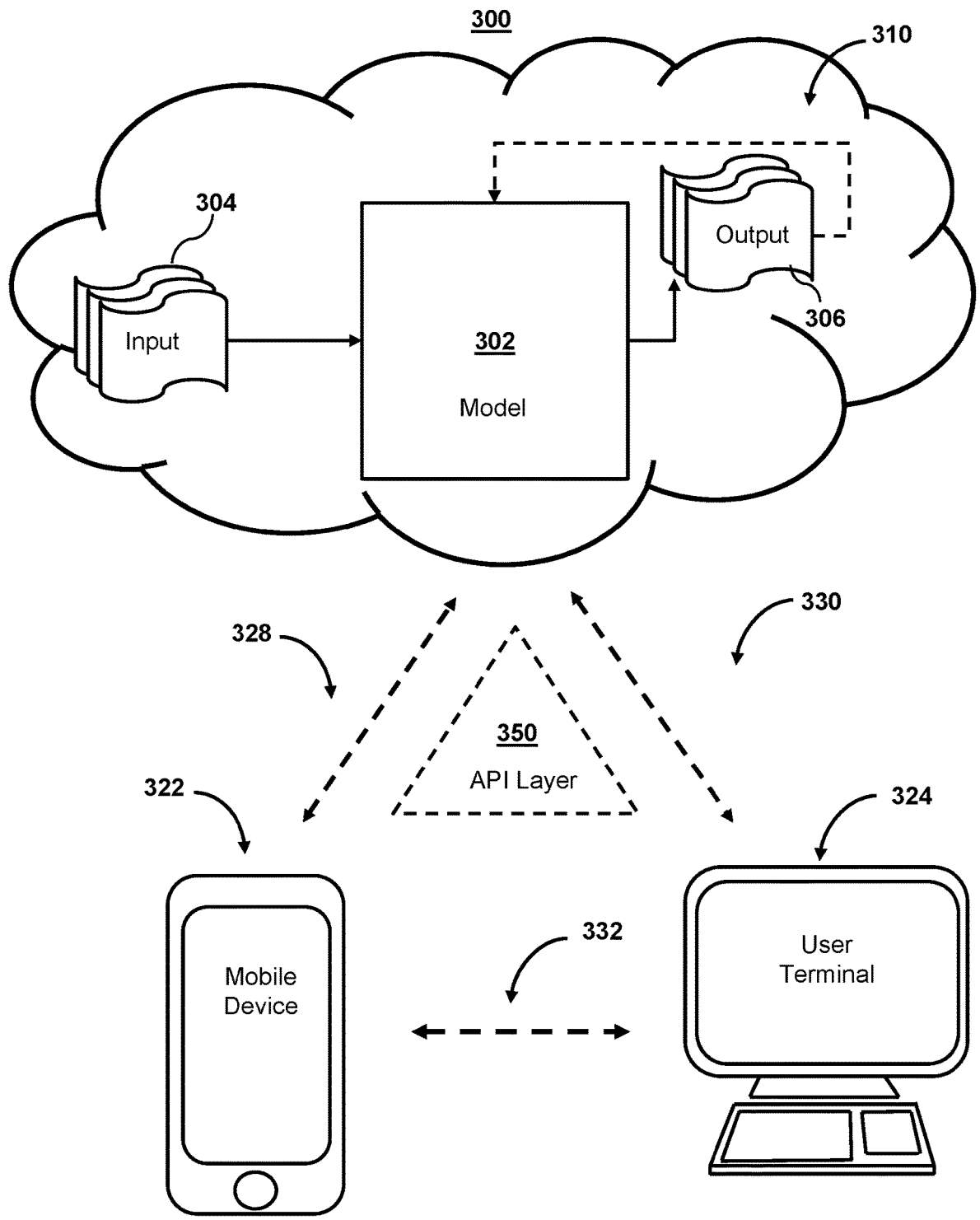
FIG. 3 shows illustrative system components for monitoring data quality issues, in accordance with one or more embodiments.

FIG. 3 shows illustrative system components for monitoring data quality issues, in accordance with one or more embodiments. For example, the system may represent the components used for monitoring data quality issues in non-native data over disparate computer networks, as shown in FIG. 1. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, or other computer equipment (e.g., a server), including "smart," wireless, wearable, and/or mobile devices. FIG. 3 also includes cloud components 310. Cloud components 310 may alternatively be any computing device as described above and may include any type of mobile terminal, fixed terminal, or other device. For example, cloud components 310 may be implemented as a cloud computing system and may feature one or more component devices. For example, cloud components 310 may house and/or enable system 100 (FIG. 1).

It should also be noted that system 300 is not limited to three devices. Users may, for instance, utilize one or more devices to interact with one another, one or more servers, or other components of system 300. It should be noted that, while one or more operations are described herein as being performed by particular components of system 300, those operations may, in some embodiments, be performed by other components of system 300. As an example, while one or more operations are described herein as being performed by components of mobile device 322, those operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact (e.g., by exchanging user information about a detected issue) with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. For example, system 300 may include input/output circuitry configured to generate for display, on a user interface, the recommendation based on the first difference.

The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., user information, detected issues, recommendations, queries, and/or notifications). For example, system 300 may include control circuitry configured to monitor incoming data entries of non-native data over a disparate computer network, wherein the data entries of non-native data corresponds to a plurality of data owners, determine a first subset of the data entries that corresponds to a first data owner, generate a first table corresponding to the first subset, wherein the first table comprises a first plurality of rows, and wherein each row of the first plurality of rows corresponds to a respective data entry in the first subset, determine a second subset of the data entries that corresponds to a second data owner, generate a second table corresponding to the second subset, wherein the second table comprises a second plurality of rows, and wherein each row of the second plurality of rows corresponds to a respective data entry in the second subset, determine a number of the first plurality of rows, determine a number of the second plurality of rows, determining, using a model, a first dynamic threshold, wherein the first dynamic threshold corresponds to the first data owner, determine a first difference between the number of the first plurality of rows and the first dynamic threshold, determine, using the model, a second dynamic threshold, wherein the second dynamic threshold corresponds to the second data owner, determine a second difference between the number of the second plurality of rows and the second dynamic threshold, and/or determine to generate a recommendation based on the first difference and to not generate the recommendation based on the second difference.

Additionally, as mobile device 322 and user terminal 324 are shown as touchscreen smartphones, these displays also act as user input interfaces. It should be noted that in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to monitoring for data quality issues and/or generating user information, detected issues, recommendations, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical discs, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein. For example, system 300 may include storage circuitry configured to store a model, wherein the model is trained to determine a dynamic threshold number corresponding to criteria based on historical data patterns.

FIG. 3 also includes communication paths 328, 330, and 332. Communication paths 328, 330, and 332 may include the internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communication paths, such as a satellite path, a fiber-optic path, a cable path, a path that supports internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may be a database configured to store user information. For example, the database may include user information that the system has collected about an issue, a data source, a recommendation, a criterion, and/or historical pattern, both actively and passively. For example, the user information may describe one or more characteristics of an issue, a data source, a recommendation, a criterion, and/or historical pattern. Alternatively or additionally, the system may act as a clearinghouse for multiple sources of user information. This information may be compiled into a user profile. Cloud components 310 may also include control circuitry configured to perform the various operations needed to generate alternative content. For example, the cloud components 310 may include cloud-based storage circuitry configured to generate alternative content. Cloud components 310 may also include cloud-based control circuitry configured to run processes to determine alternative content. Cloud components 310 may also include cloud-based input/output circuitry configured to display recommendations.

Cloud components 310 may include model 302, which may be a machine learning model (e.g., as described in FIG. 3). Model 302 may take inputs 304 and provide outputs 306. The inputs may include multiple datasets, such as a training dataset and a test dataset. Each of the plurality of datasets (e.g., inputs 304) may include data subsets related to user data, predicted severities, and/or actual severities. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., about an issue, a data source, a recommendation, a false positive recommendation, a criterion, and/or a historical pattern).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions (e.g., about an issue, a data source, a recommendation, a false positive recommendation, a criterion, and/or historical pattern).

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free flowing, with connections interacting in a more chaotic and complex fashion. During testing, an output layer of model 302 may indicate whether or not a given input corresponds to a classification of model 302.

In some embodiments, model 302 may predict a false positive recommendation (or that a recommendation is likely a false positive) For example, the system may determine that particular characteristics are more likely to be indicative of a prediction. In some embodiments, the model (e.g., model 302) may automatically perform actions based on outputs 306. In some embodiments, the model (e.g., model 302) may not perform any actions. The output of the model (e.g., model 302) may be used to generate for display, on a user interface, a recommendation based on the false positive (or determine not to generate a recommendation).

System 300 also includes API layer 350. API layer 350 may allow the system to generate recommendations across different devices. In some embodiments, API layer 350 may be implemented on mobile device 322 or user terminal 324. Alternatively or additionally, API layer 350 may reside on one or more of cloud components 310. API layer 350 (which may be a REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open-source API platforms and their modules. API layer 350 may use developer portal. API layer 350 may use strong security constraints applying WAF and DDoS protection, and API layer 350 may use RESTful APIs as standard for external integration.

Figure 4:
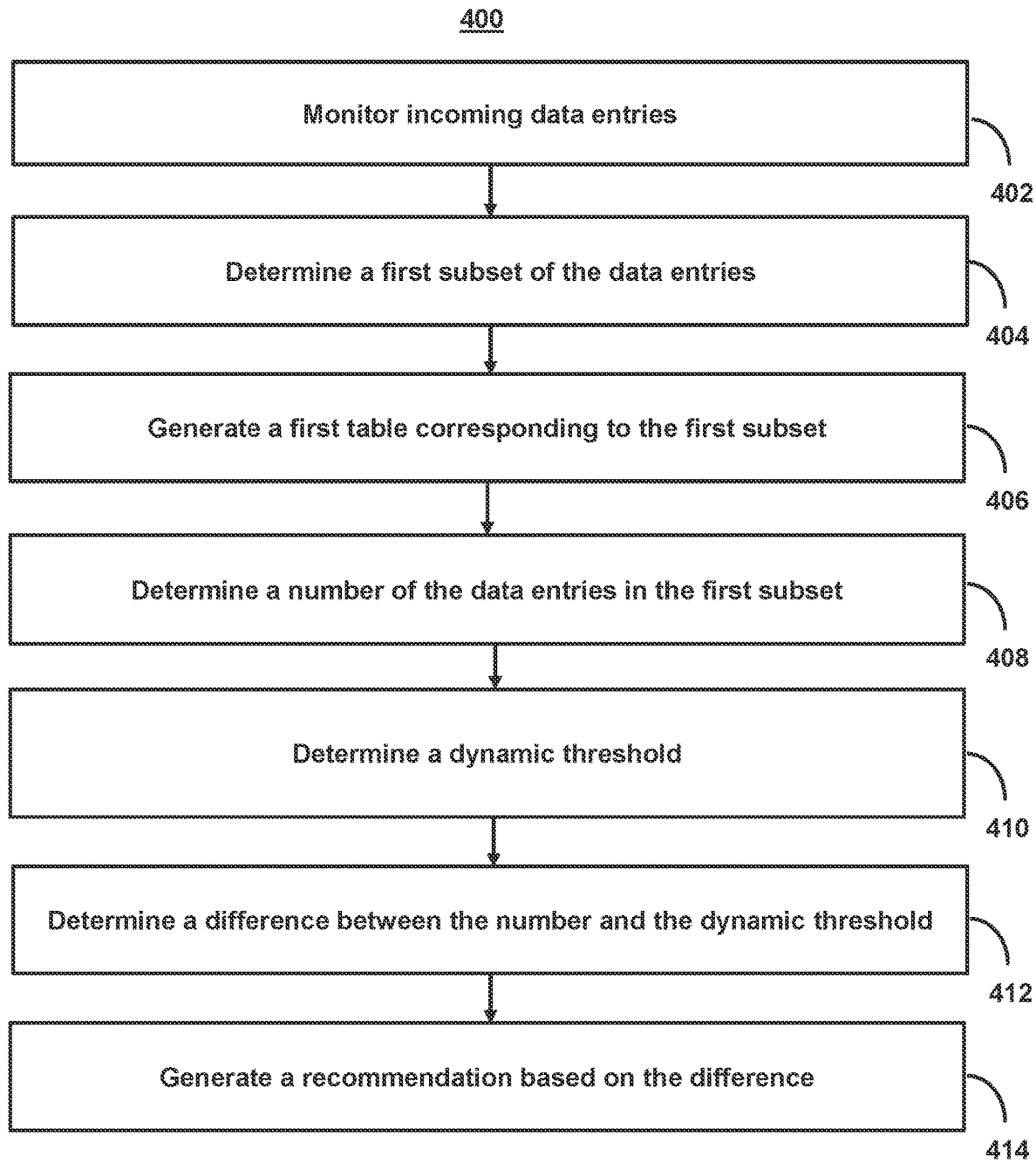
FIG. 4 shows a flowchart of the steps involved in monitoring data quality issues in non-native data over disparate computer networks, in accordance with one or more embodiments.

FIG. 4 shows a flowchart of the steps involved in monitoring data quality issues in non-native data over disparate computer networks in accordance with one or more embodiments. For example, process 400 may represent the steps taken by one or more devices as shown in FIGS. 1-2 when monitoring data quality issues. For example, the system may use the architecture of system 100 (FIG. 1) to generate user interface 200 (FIG. 2).

At step 402, process 400 (e.g., using one or more components in system 300 (FIG. 3)) monitors incoming data entries. For example, the system may monitor incoming data entries of non-native data over a disparate computer network. For example, as data traverses a disparate computer network (e.g., a computer network featuring multiple nodes) it may become corrupted, duplicated, or dropped because the data must go through multiple systems and each time the data is modified and adjusted. At any point along the journey, there may be a computer system (e.g., corresponding to a node in the network) where a job failed (e.g., causing missing data) or a job was executed twice (e.g., causing a duplication). There may also be proprietary systems that obscure the data as well as re-formatting, making adjustments to the data using configuration files, and/or standardization of the data (e.g., causing further changes). Accordingly, the information in a communication may change and may change in ways in which the creator cannot contain. As such, queries to the creator would not be helpful during a reconciliation and validation process of non-native data (i.e., data not created by the monitoring party).

At step 404, process 400 (e.g., using one or more components in system 300 (FIG. 3)) determine a first subset of the data entries. For example, the system may determine a first subset of the data entries that corresponds to a first criterion. For example, the system may filter the incoming data entries of non-native data for entries corresponding to the specific criteria. This may include entries corresponding to a single table.

At step 406, process 400 (e.g., using one or more components in system 300 (FIG. 3)) generates a first table corresponding to the first subset. For example, the system may generate a first table corresponding to the first subset, wherein the first table comprises a first plurality of rows, and wherein each row of the first plurality of rows corresponds to a respective data entry in the first subset.

At step 408, process 400 (e.g., using one or more components in system 300 (FIG. 3)) determines a number of the data entries in the first subset. For example, the system may determine a number of the first plurality of rows. For example, as described above in FIG. 2, the data entries may be populated in a table specific to the criterion. The number of data entries may correspond to a number of rows.

At step 410, process 400 (e.g., using one or more components in system 300 (FIG. 3)) determines a dynamic threshold. For example, the system may determine, using a model, a first dynamic threshold, wherein the first dynamic threshold corresponds to the first criterion, wherein the model is trained to determine a dynamic threshold number corresponding to criteria based on historical data patterns. For example, the model may be trained to determine the dynamic threshold number corresponding to criteria based on historical user feedback indicating data entries linked to a false positive difference (e.g., as reported by a user based on user information). For example, the criterion may correspond to a given category (or group of categories) such as a merchant that generates data entries (e.g., credit card transactions). The system may, therefore, generate a dynamic threshold specific to this merchant and/or the volume of transactions that are received from that merchant on a given day, month, or other time period.

In some embodiments, the model may be a tree-based, machine learning model that automatically identifies an expected number of rows for a given table based on historic data entry patterns. Tree-based models are a family of supervised Machine Learning which performs classification and regression tasks by building a tree-like structure for deciding the target variable class or value according to the features. Tree-based models are particularly beneficial in predicting tabular and spatial datasets.

In some embodiments, the system may determine an average number of data entries that are expected to be received based on a criterion (e.g., a merchant, time period, etc.). For example, when determining the first dynamic threshold, the system may determine an average number of rows in a historical table, wherein the average number of rows is based on historical data corresponding to the first criterion. The average number of rows may correspond to the average number of data entries for the first criterion. The system may then determine a probability range based on the average number of rows. For example, the system may generate alerts if a difference between the number of the first plurality of rows and the first dynamic threshold is outside an acceptable range (e.g., a standard deviation from the average).

In some embodiments, the system may monitor for and/or determine a dynamic threshold based on the use of outlier detection. For example, the system may monitor for outliers that may or may not cause a recommendation to be generated. For example, the system may determine one-time volume deviations based on rolling averages of data entries over time. The system may then determine whether one or more of the one-time volume deviations are outliers based on parametric analysis. For example, the system may generate a model that assumes that sample data comes from a population that can be adequately modeled by a probability distribution that has a fixed set of parameters. That is, the system may perform a parametric analysis, or a sensitivity analysis, to determine an influence of different geometric or physical parameters or both on the outlier. Additionally or alternatively, the system may determine whether one or more of the one-time volume deviations are outliers based on multivariate outlier detection. For example, the system may detect multivariate outliers with the use of Mahalanobis distance, which is the distance of a data point from the calculated centroid of the other cases where the centroid is calculated as the intersection of the mean of the variables being assessed.

For example, each point in a model is recognized as an X, Y combination and multivariate outliers lie a given distance from the other cases. The distances are interpreted using a $p<0.001$ and the corresponding $x2$ value with the degrees of freedom equal to the number of variables. Multivariate outliers can also be recognized using leverage, discrepancy, and influence. Leverage is related to Mahalanobis distance but may be measured on a different scale so that the $x2$ distribution does not apply. Large scores may indicate the case if further out however may still lie on the same line. Discrepancy assesses the extent that the case is in line with the other cases. Influence is determined by leverage and discrepancy and assesses changes in coefficients when cases are removed. Cases >1.00 are likely to be considered outliers.

At step 412, process 400 (e.g., using one or more components in system 300 (FIG. 3)) determines a difference between the number and the dynamic threshold. For example, the system may determine a difference between the number of the first plurality of rows and the first dynamic threshold. For example, the system may determine if the difference is outside of a probability threshold defined by the dynamic threshold and/or exceeds a proximity from the dynamic threshold. The system may allow a user to predetermine an acceptable difference or range of the dynamic threshold. Furthermore, the difference (along with the dynamic threshold) may vary. That is, the difference may be a dynamic difference that is based on current total volume (e.g., the number of data entries for all subsets and/or for all criteria). Additionally, the system may receive real-time updates (e.g., from users reviewing user information). The system may automatically update the difference and/or dynamic threshold based on the user updates.

At step 414, process 400 (e.g., using one or more components in system 300 (FIG. 3)) generates a recommendation based on the difference. For example, the system may generate for display, on a user interface, a recommendation based on the difference. In some embodiments, the system may apply a criterion to determining whether or not to generate a recommendation (e.g., an alert of a potential issue). For example, the system may determine a degree of deviation of data entry volume based on the difference. The system may select the recommendation from a plurality of recommendations based on the degree of deviation.

It is contemplated that the steps or descriptions in FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-3 could be used to perform one of more of the steps in FIG. 4.

Figure 5:
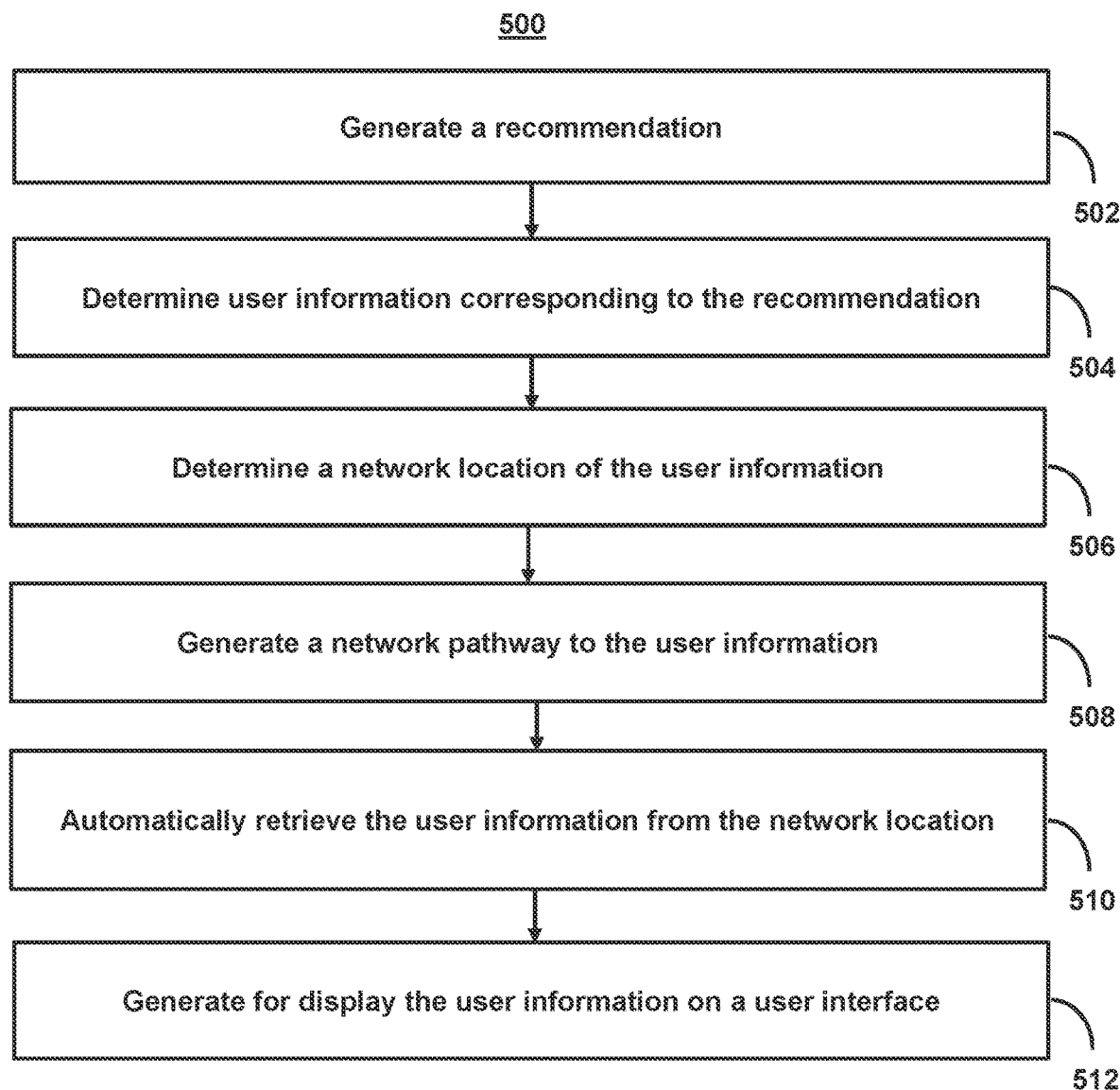
FIG. 5 shows a flowchart of the steps involved in generating user information on a user interface based on a detected issue, in accordance with one or more embodiments.

FIG. 5 shows a flowchart of the steps involved in generating user information on a user interface based on monitoring data quality issues in non-native data over disparate computer networks, in accordance with one or more embodiments. For example, process 500 may represent the steps taken by one or more devices, as shown in FIGS. 1-3, when generating user information. For example, in some embodiments, the system may detect an issue based on monitoring data quality issues in non-native data over disparate computer networks. The system may, in addition to the recommendation, generate user information associated with the issue, and the system may generate this user information for display to a user. The user (e.g., a service representative associated with a provider of the application) may then review the user information to determine if the recommendation is correct or a false positive. Additionally or alternatively, the system may locate information, determine a network pathway to quickly and efficiently retrieve this information, and/or pre-fetch this information. In each case, the system may more efficiently (and in less time) obtain relevant information that may inform the user about the issue and/or the reasons it was detected.

At step 502, process 500 (e.g., using one or more components in system 300 (FIG. 3)) generates, at a user interface corresponding to a user, a recommendation based on monitoring data quality issues in non-native data over disparate computer networks. For example, the system may, in response to detecting an issue, generate, at a user interface corresponding to the issue, a recommendation. For example, the system may generate user interface 200 (FIG. 2).

At step 504, process 500 (e.g., using one or more components in system 300 (FIG. 3)) determines user information corresponding to the recommendation. For example, the system may determine user information corresponding to the recommendation. User information may be information transferred across the functional interface between a source user and a telecommunications system for delivery to a destination user. The user information may include information about an issue and/or a cause of the issue.

At step 506, process 500 (e.g., using one or more components in system 300 (FIG. 3)) determines a network location of the user information. For example, the system may determine a network location of the user information. For example, a network location may be a profile that includes a collection of network and sharing settings that are applied to the network the system is connected to, including user settings, authorizations, user information access restrictions, data source availability, etc. Based on the network location assigned to the system's active network connection, features such as information retrieval, network discovery, etc. may be enabled or disabled.

At step 508, process 500 (e.g., using one or more components in system 300 (FIG. 3)) generates a network pathway to the user information. For example, the system may generate a network pathway (e.g., on the network associated with a data source of the monitored data entries) to the user information. For example, the system may generate one or more network pathways based on correlation-based network analysis combined with machine-learning techniques. For example, the system may use machine learning (e.g., as described in FIG. 3 above) to select a path for traffic in a network or between or across multiple networks. The system may traverse and/or process information for numerous types of networks, including circuit-switched networks, such as the public switched telephone network (PSTN), and computer networks, such as the Internet.

At step 510, process 500 (e.g., using one or more components in system 300 (FIG. 3)) automatically retrieves the user information from the network location. For example, the system may automatically retrieve the user information from the network location in response to the issue. For example, during the information retrieval process, the system may obtain information from system resources that are relevant to an information need about the issue from a collection of those resources.

At step 512, process 500 (e.g., using one or more components in system 300 (FIG. 3)) generates for display the user information on a user interface. For example, the system may simultaneously generate user information in user interface 200 (FIG. 2) in order for a user to determine whether or not the issue is a false positive.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-3 could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for monitoring data quality issues in non-native data over disparate computer networks, the method comprising: monitoring incoming data entries of non-native data over a disparate computer network; determining a first subset of the data entries that corresponds to a first criterion; generating a first table corresponding to the first subset, wherein the first table comprises a first plurality of rows, and wherein each row of the first plurality of rows corresponds to a respective data entry in the first subset; determining a number of the first plurality of rows; determining, using a model, a first dynamic threshold, wherein the first dynamic threshold corresponds to the first criterion, wherein the model is trained to determine a dynamic threshold number corresponding to criteria based on historical data patterns; determining a difference between the number of the first plurality of rows and the first dynamic threshold; and generating for display, on a user interface, a recommendation based on the difference.

2. The method of any one of the preceding embodiments, wherein determining the first dynamic threshold comprises: determining an average number of rows in a historical table, wherein the average number of rows is based on historical data corresponding to the first criterion; and determining a probability range based on the average number of rows.

3. The method of any one of the preceding embodiments, wherein determining the first dynamic threshold comprises: determining one-time volume deviations based on rolling averages of data entries over time and determining whether one or more of the one-time volume deviations are outliers based on parametric analysis.

4. The method of any one of the preceding embodiments, wherein determining the first dynamic threshold comprises: determining one-time volume deviations based on rolling averages of data entries over time and determining whether one or more of the one-time volume deviations are outliers based on multivariate outlier detection.

5. The method of any one of the preceding embodiments, wherein the model is further trained to determine the dynamic threshold number corresponding to criteria based on historical user feedback indicating data entries linked to a false positive difference.

6. The method of any one of the preceding embodiments, further comprising: determining user information corresponding to the recommendation and determining a network location of the user information; and generating a network pathway to the user information.

7. The method of any one of the preceding embodiments, further comprising: automatically retrieving the user information from the network location and generating for display the user information on the user interface.

8. The method of any one of the preceding embodiments, further comprising: retrieving contact information for a data owner corresponding to the first subset and transmitting the recommendation to the data owner.

9. The method of any one of the preceding embodiments, wherein the model is a tree-based, machine learning model that automatically identifies an expected number of rows for a given table based on historic data entry patterns.

10. The method of claim 2, further comprising: determining a degree of deviation of data entry volume based on the difference and selecting the recommendation from a plurality of recommendations based on the degree of deviation.

11. A tangible, non-transitory, machine-readable medium storing instructions that, when executed by a data processing apparatus, cause the data processing apparatus to perform operations comprising those of any of embodiments 1-10.

12. A system comprising: one or more processors and memory storing instructions that, when executed by the processors, cause the processors to effectuate operations comprising those of any of embodiments 1-10.

13. A system comprising means for performing any of embodiments 1-10.

We claim:

1. A system for monitoring data quality issues in non-native data over disparate computer networks based on predictions or probabilities for numbers of received data entries in a given class, the system comprising:
   storage circuitry configured to store a model, wherein the model is trained to determine a dynamic threshold number of rows corresponding to different data owners based on historical data patterns;
   control circuitry configured to:
   monitor incoming data entries of non-native data over a disparate computer network, wherein the data entries of non-native data corresponds to a plurality of data owners;
   determine a first subset of the data entries that corresponds to a first data owner;
   generate a first table corresponding to the first subset, wherein the first table comprises a first plurality of rows, and wherein each row of the first plurality of rows corresponds to a respective data entry in the first subset;
   determine a second subset of the data entries that corresponds to a second data owner;
   generate a second table corresponding to the second subset, wherein the second table comprises a second plurality of rows, and wherein each row of the second plurality of rows corresponds to a respective data entry in the second subset;
   determine a number of the first plurality of rows;
   determine a number of the second plurality of rows;
   determine, using the model, a first dynamic threshold row number, wherein the first dynamic threshold row number corresponds to the first data owner;
   determine a first difference between the number of the first plurality of rows and the first dynamic threshold row number;
   determine, using the model, a second dynamic threshold row number, wherein the second dynamic threshold row number corresponds to the second data owner;
   determine a second difference between the number of the second plurality of rows and the second dynamic threshold row number;
   determine to generate a recommendation based on the first difference and to not generate the recommendation based on the second difference; and
   input/output circuitry configured to generate for display, on a user interface, the recommendation based on the first difference, wherein the recommendation comprises a user alert related missing or duplicate data entries.

2. A method for monitoring data quality issues in non-native data over disparate computer networks based on predictions or probabilities for numbers of received data entries in a given class, the method comprising:
   monitoring incoming data entries of non-native data over a disparate computer network;
   determining a first subset of the data entries that corresponds to a first time period;
   generating a first table corresponding to the first subset, wherein the first table comprises a first plurality of rows, and wherein each row of the first plurality of rows corresponds to a respective data entry in the first subset;
   determining a number of the first plurality of rows;
   determining, using a model, a first dynamic threshold row number, wherein the first dynamic threshold row number corresponds to the first time period, wherein the model is trained to determine a dynamic threshold number of rows corresponding to different time periods based on historical data patterns;
   determining a difference between the number of the first plurality of rows and the first dynamic threshold row number; and generating for display, on a user interface, a recommendation based on the difference, wherein the recommendation comprises a user alert related missing or duplicate data entries.

3. The method of claim 2, wherein determining the first dynamic threshold row number comprises:
determining an average number of rows in a historical table, wherein the average number of rows is based on historical data corresponding to the first time period; and
determining a probability range based on the average number of rows.

4. The method of claim 2, wherein determining the first dynamic threshold row number comprises:
determining one-time volume deviations based on rolling averages of data entries over time; and
determining whether one or more of the one-time volume deviations are outliers based on parametric analysis.

5. The method of claim 2, wherein determining the first dynamic threshold row number comprises:
determining one-time volume deviations based on rolling averages of data entries over time; and
determining whether one or more of the one-time volume deviations are outliers based on multivariate outlier detection.

6. The method of claim 2, wherein the model is further trained to determine the dynamic threshold number of rows corresponding to the different time periods based on historical user feedback indicating data entries linked to a false positive difference.

7. The method of claim 2, further comprising:
automatically retrieving user information from a network location; and
generating for display the user information on the user interface.

8. The method of claim 2, further comprising:
retrieving contact information for a data owner corresponding to the first subset; and
transmitting the recommendation to the data owner.

9. The method of claim 2, wherein the model is a tree-based, machine learning model that automatically identifies an expected number of rows for a given table based on historic data entry patterns.

10. A non-transitory, computer readable medium for monitoring data quality issues in non-native data over disparate computer networks based on predictions or probabilities for numbers of received data entries in a given class comprising instructions that when executed by one or more processors cause operations comprising:
monitoring incoming data entries of non-native data over a disparate computer network;
determining a first subset of the data entries that corresponds to a first data owner;
generating a first table corresponding to the first subset, wherein the first table comprises a first plurality of rows, and wherein each row of the first plurality of rows corresponds to a respective data entry in the first subset;
determining a number of the first plurality of rows;
determining, using a model, a first dynamic threshold row number, wherein the first dynamic threshold row number corresponds to the first data owner, wherein the model is trained to determine a dynamic threshold number of rows corresponding to different data owners based on historical data patterns;
determining a difference between the number of the first plurality of rows and the first dynamic threshold row number; and
generating for display, on a user interface, a recommendation based on the difference, wherein the recommendation comprises a user alert related missing or duplicate data entries.

11. The non-transitory, computer readable medium of claim 10, wherein determining the first dynamic threshold row number comprises:
determining an average number of rows in a historical table, wherein the average number of rows is based on historical data corresponding to the first data owner; and
determining a probability range based on the average number of rows.

12. The non-transitory, computer readable medium of claim 10, wherein determining the first dynamic threshold row number comprises:
determining one-time volume deviations based on rolling averages of data entries over time; and
determining whether one or more of the one-time volume deviations are outliers based on parametric analysis.

13. The non-transitory, computer readable medium of claim 10, wherein determining the first dynamic threshold row number comprises:
determining one-time volume deviations based on rolling averages of data entries over time; and
determining whether one or more of the one-time volume deviations are outliers based on multivariate outlier detection.

14. The non-transitory, computer readable medium of claim 10, wherein the model is further trained to determine the dynamic threshold number of rows corresponding to the different data owners based on historical user feedback indicating data entries linked to a false positive difference.

15. The non-transitory, computer readable medium of claim 10, wherein the instructions further cause operations comprising:
automatically retrieving the user information from a network location; and
generating for display the user information on the user interface.

16. The non-transitory, computer readable medium of claim 10, wherein the instructions further cause operations comprising:
retrieving contact information for a data owner corresponding to the first subset; and
transmitting the recommendation to the data owner.

17. The non-transitory, computer readable medium of claim 10, wherein the model is a tree-based, machine learning model that automatically identifies an expected number of rows for a given table based on historic data entry patterns.

* * * * *